July 6, 1954   F. E. McLAUGHLIN   2,682,889
TANK INLET VALVE
Filed Feb. 4, 1950
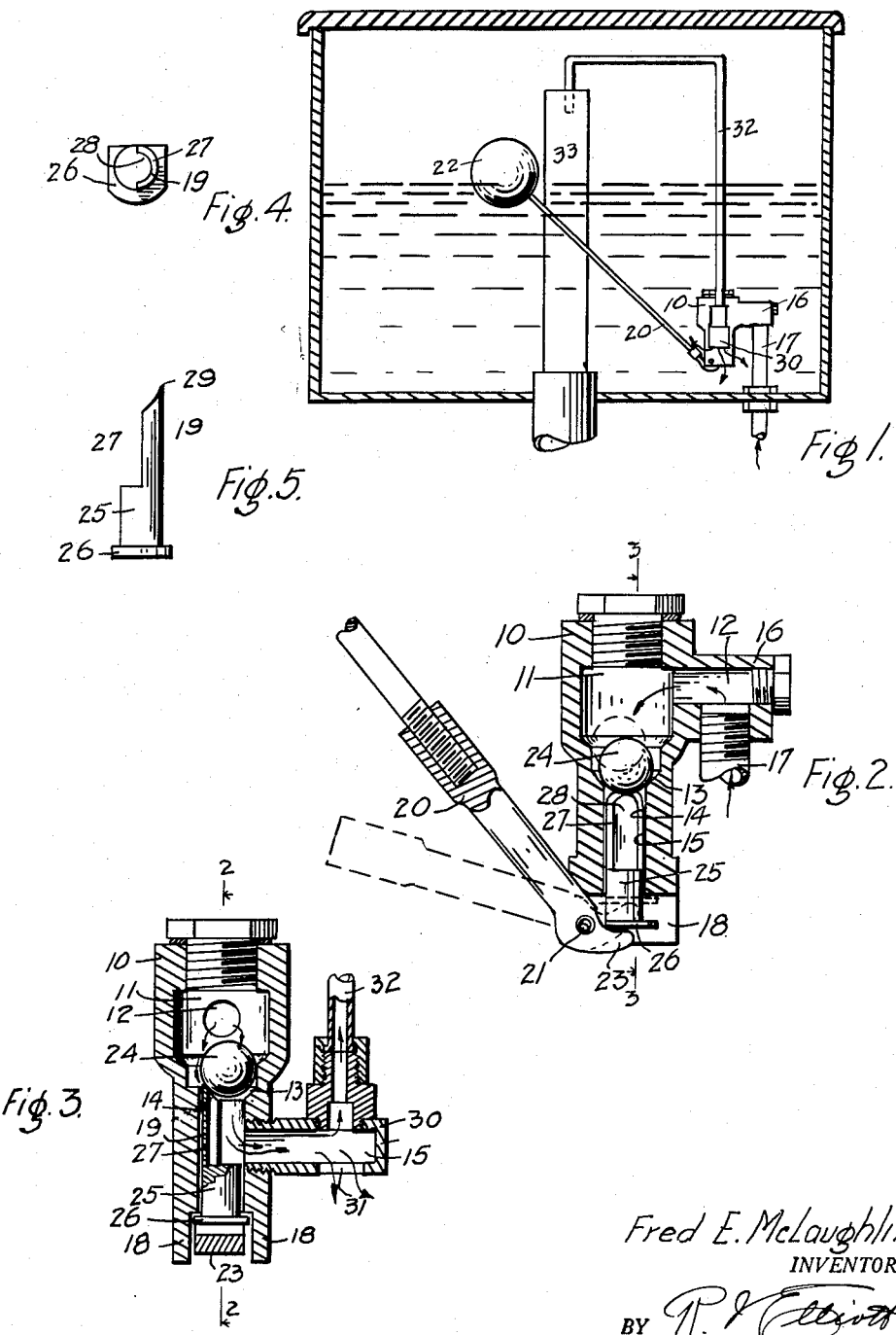
Fred E. McLaughlin
INVENTOR.
BY 
ATTORNEY Patented July 6, 1954

2,682,889

UNITED STATES PATENT OFFICE 2,682,889

TANK INLET VALVE

Fred E. McLaughlin, Centralia, Wash., assignor to Howard P. Braman, Tacoma, Wash.

Application February 4, 1950, Serial No. 142,502

2 Claims. (Cl. 137—449)

This invention relates to valves and especially to the inlet valves of toilet tanks.

The objects of my invention are, first, to produce a ball valve structure which will operate silently, without chatter; second, to provide means to displace the ball valve laterally to open the valve; third, to provide a valve which will be substantially free from wear; and fourth, to provide a valve made of the fewest possible parts, which is cheap to make, easy to install, and effective in use.

I attain these and other objects as will be evident to those skilled in the art, by the devices, mechanisms, and arrangements illustrated in the accompanying drawings, in which—

Fig. 1 is a vertical section of a toilet tank showing my improved valve installed therein; Fig. 2 is a vertical section of my valve, taken on the line 2—2 in Fig. 3, and showing the valve closed; Fig. 3 is a similar view, taken on the line 3—3 in Fig. 2, and showing the valve open; Fig. 4 is a plan view of the valve lifter; and Fig. 5 is a side elevation thereof.

Identical numerals of reference refer to the same parts throughout the several views.

I am aware that many valves have been invented which use metal balls as the active element. The balls of these valves have been raised off their seats by a central pin with the result that, when the water is flowing therepast, they violently spin and vibrate causing loud and disagreeable chatter and a fluctuating flow of the water in the supply pipe. The main purpose of this invention is to eliminate all these objections.

This purpose is accomplished mainly by two means; first, the ball itself is made of rubber instead of metal; and second, the displacing pin, or lifter, does not engage centrally under the ball but displaces it and raises it off the valve seat from one side alone, thus pushing the ball laterally against the side and allowing the water to flow freely therepast, without resulting disagreeable noise and chatter.

Referring now to the drawings, it will be seen that the frame or body 10 of the valve comprises an upper chamber 11, into which the receiving passage 12 empties, and having a suitable valve seat 13 formed at its lower end, said valve seat surrounding the upper end of the vertical passage 14 forming a lower outlet chamber with which the outflow passage 15 connects. The receiving passage 12 is contained in a side extension 16 of the frame 10, into which the supply pipe 17 is securely tapped whereby the entire valve structure is supported. The lower end of the vertical passage 14 opens out between two flanges 18, and contains the valve lifter 19 which is particularly illustrated in Figs. 4 and 5.

The float lever 20 is pivoted to the frame 10 at 21 and lies between the said flanges 18, and is provided at its upper end by a suitable float 22 in the usual manner. The lever 20 is provided at its lower end with a toe 23 extending therefrom under the vertical passage 14, as clearly seen in Fig. 2.

The valve 24 comprises a spherical ball, preferably made of rubber, and adapted to stop the passage of water therepast when it is resting on the valve seat 13. Since the full water pressure of the water system is located in the upper chamber 11 as against the head of water in the tank, it follows that there will be considerable pressure on the ball 24 to hold it solidly down on the seat 13, and since the ball is made of rubber, which is slightly resilient, the ball will close any unevenness in the contact between it and the seat.

The vertical passage 14 is provided with a loose lifter 19 comprising a solid cylindrical part 25 which fits loosely in the passage 14 and extends out therefrom to the space between the two flanges 18, and above the toe 23 of the lever 20. The base 26 of the lifter 19 is shaped so that it prevents the cylinder 25 from turning in the passage 14. A valve lifting finger 27, of the lifter 19 (Figs. 4, 5) extends upward from the solid cylindrical portion 25 and comprises a part thereof cut away longitudinally at 28 so as to leave only an arc subtending about one-half of the circle, and hollowed out with its upper end 29 pointed as shown. Thus the valve lifter 19 only touches the ball 24 at a point well removed from its central vertical diameter, and when the said lifter 19 is raised the finger end 29 pushes the ball 24 to one side, off the seat 13, and against the side wall of the chamber 11, permitting the free flow of the water therepast and holding the ball from causing any noise as the water flows.

The valve lifter is raised by the toe extension 23 of the lever 20 as soon as the float falls below a determined level, thus opening the valve to permit water to flow past the finger 27 and out into the tank by the passage 15. The passage 15 is positioned in a second side extension 30 of the frame 10, through which an opening 31 permits the water to enter the tank.

A refill pipe 32 connects with the passage 15 and leads to the main overflow tube 33 of the normal outflow valve.

Thus it will be seen that my improved tank inlet valve is made of the fewest and simplest parts; does not raise the ball valve from its center, as in the usual ball valve construction, but displaces it laterally to allow the water to pass without spinning or other objectionable noisy movement, and holds it in such position; and that the action of the valve is enhanced by making the ball of rubber.

It is to be understood that many changes in the construction of the valve and its parts may be made without departing from the spirit of my invention as outlined in the appended claims.

Having described my invention, what I claim and desire to secure by Letters Patent is:

1. An inlet valve for flush-type tanks, comprising: a valve body having an upper inlet chamber and a lower outlet chamber therein in communication with each other, said body including a metal valve seat between said chambers and a resilient ball valve mounted in said upper chamber to rest directly upon said metal valve seat to interrupt communication between said chambers; said lower chamber having an outlet lateral therefrom with relation to the flow of liquid from the inlet chamber to the outlet chamber, said lower chamber also having a vertical cylindrical guideway passage beneath said valve, a tappet mounted in said guideway passage having a solid cylindrical body positioned beneath said lateral outlet and having an upstanding finger extending above said lateral outlet, said finger having a hollowed-out substantially hemicylindrical shape with a pointed upper end disposed on that side of the tappet away from the lateral opening, said tappet being vertically movable from a lower position in which said finger is disposed below said valve seat to an upper position in which said finger extends through said valve seat contacting said ball valve displacing the latter from the seat and to one side and holding the ball valve against the side wall of said upper chamber with its hollow side to prevent chattering of the valve; means including a lifting finger operating against the bottom of said tappet to raise the same from said lower position to said upper position responsive to the lowering of the liquid level in the flush tank and permitting lowering of said tappet upon raising of the liquid level; said valve body and the lower end of said tappet having interengaging means preventing rotation of said tappet with respect to said lateral opening.

2. An inlet valve for flush-type tanks, comprising: a valve body having an upper inlet chamber and a lower outlet chamber therein in communication with each other, said body including a metal valve seat between said chambers, a resilient ball valve mounted in said upper chamber to rest directly upon said metal valve seat to interrupt communication between said chambers; said lower chamber having an outlet lateral therefrom with relation to the flow of liquid from the inlet chamber to the outlet chamber, said lower chamber also having a vertical guideway passage beneath said valve seat, a tappet mounted in said guideway passage having a solid cylindrical body positioned beneath said lateral outlet and having a relatively narrow upstanding finger extending above said lateral outlet, said finger being eccentric of the tappet to that side away from the lateral opening, said tappet being vertically movable from a lower position in which said finger is disposed below said valve seat to an upper position in which said finger extends through said valve seat contacting said ball valve to displace the latter from the seat and to one side; means including a lifting finger operating against the bottom of said tappet to raise the same from said lower position to said upper position responsive to the lowering of the liquid level in the flush tank and permitting lowering of said tappet upon raising of the liquid level; said valve body having a pair of flanges depending beneath said guideway passage on either side and the lower end of said tappet having a pair of flat surfaces on either side abutting the sides of said flanges preventing rotation of said tappet with respect to said lateral opening.

References Cited in the file of this patent

UNITED STATES PATENTS

| Number | Name | Date |
|---|---|---|
| 571,168 | Mott | Nov. 10, 1896 |
| 925,153 | Barry | June 15, 1909 |
| 1,042,775 | English | Oct. 29, 1912 |
| 1,140,712 | Price | May 25, 1915 |
| 1,384,450 | Greeson | July 12, 1921 |
| 1,447,231 | Barry | Mar. 6, 1923 |
| 1,476,029 | Black | Dec. 4, 1923 |
| 1,494,786 | Kawalle | May 20, 1924 |
| 2,246,388 | Sica | June 17, 1941 |